United States Patent
Felisari et al.

(10) Patent No.: US 9,139,440 B2
(45) Date of Patent: Sep. 22, 2015

(54) PROCESS FOR THE PREPARATION OF NANO-SCALED GRAPHENE PLATELETS WITH A HIGH DISPERSIBILITY IN LOW-POLARITY POLYMERIC MATRIXES AND RELATIVE POLYMERIC COMPOSITIONS

(75) Inventors: Riccardo Felisari, San Giorgio di Mantova (IT); Olga Valentino, Mantova (IT); Alessandro Casalini, Mantova (IT)

(73) Assignee: Versalis S.p.A., San Donato Milanese (IT)

( * ) Notice: Subject to any disclaimer, the term of this patent is extended or adjusted under 35 U.S.C. 154(b) by 439 days.

(21) Appl. No.: 13/505,862

(22) PCT Filed: Oct. 27, 2010

(86) PCT No.: PCT/IB2010/002762
§ 371 (c)(1),
(2), (4) Date: Jul. 10, 2012

(87) PCT Pub. No.: WO2011/055198
PCT Pub. Date: May 12, 2011

(65) Prior Publication Data
US 2012/0270960 A1 Oct. 25, 2012

(30) Foreign Application Priority Data
Nov. 3, 2009 (IT) .............................. MI2009A1920

(51) Int. Cl.
*C01B 31/00* (2006.01)
*C01B 31/04* (2006.01)
*B82Y 30/00* (2011.01)
*B82Y 40/00* (2011.01)

(52) U.S. Cl.
CPC .............. *C01B 31/0476* (2013.01); *B82Y 30/00* (2013.01); *B82Y 40/00* (2013.01); *C01B 31/043* (2013.01); *C01B 2204/04* (2013.01); *C01B 2204/22* (2013.01); *C01B 2204/30* (2013.01); *C01B 2204/32* (2013.01); *Y10T 428/2982* (2015.01)

(58) Field of Classification Search
USPC .................................. 423/448; 977/734, 775
See application file for complete search history.

(56) References Cited

U.S. PATENT DOCUMENTS

| 8,110,026 B2 * | 2/2012 | Prud'Homme et al. ............ 96/4 |
| 2010/0056819 A1 * | 3/2010 | Jang et al. ..................... 556/478 |
| 2010/0147188 A1 | 6/2010 | Mamak et al. |

FOREIGN PATENT DOCUMENTS

WO 2009 106507 9/2009

OTHER PUBLICATIONS

Liang et al. "Transparent, highly conductive graphene electrodes from acetylene-assisted thermolysis of graphite oxide sheets and nanographene molecules." Oct. 2, 2009. Nanotechnology 20 (2009) 434007. pp. 1-6.*
Liang et al., "Transparent, highly conductive grapheme electrodes from acetylene-assisted thermolysis of graphite oxide sheets and nanographene molecules," from Nanotechnology, vol. 20 (2009).*
Hummers et al., "Preparation of Graphitic Oxide," J. Am. Chem. Soc., (1957), p. 1339.*
Shen, J., et al., "Fast and Facile Preparation of Graphene Oxide and Reduced Graphene Oxide Nanoplatelets," Chemistry of Materials, vol. 21, pp. 3514-3520, XP 002583613, (2009).
International Search Report Issued Jan. 25, 2011 in PCT/IB10/02762 Filed Oct. 27, 2010.

* cited by examiner

*Primary Examiner* — Kara Boyle
(74) *Attorney, Agent, or Firm* — Oblon, McClelland, Maier & Neustadt, L.L.P.

(57) ABSTRACT

A process for the production of nano-scaled graphene platelets which comprises: a) putting a graphite material in contact with molecular or atomic oxygen or a substance capable of releasing molecular or atomic oxygen, obtaining a precursor consisting of graphite material functionalized with oxygen groups (FOG), characterized by a carbon/oxygen molar ratio higher than 8:1 b) subsequently, reducing (chemically or physically) said FOG precursor obtaining nano-scaled graphene platelets characterized by a carbon/oxygen molar ratio higher than 20:1.

12 Claims, 1 Drawing Sheet

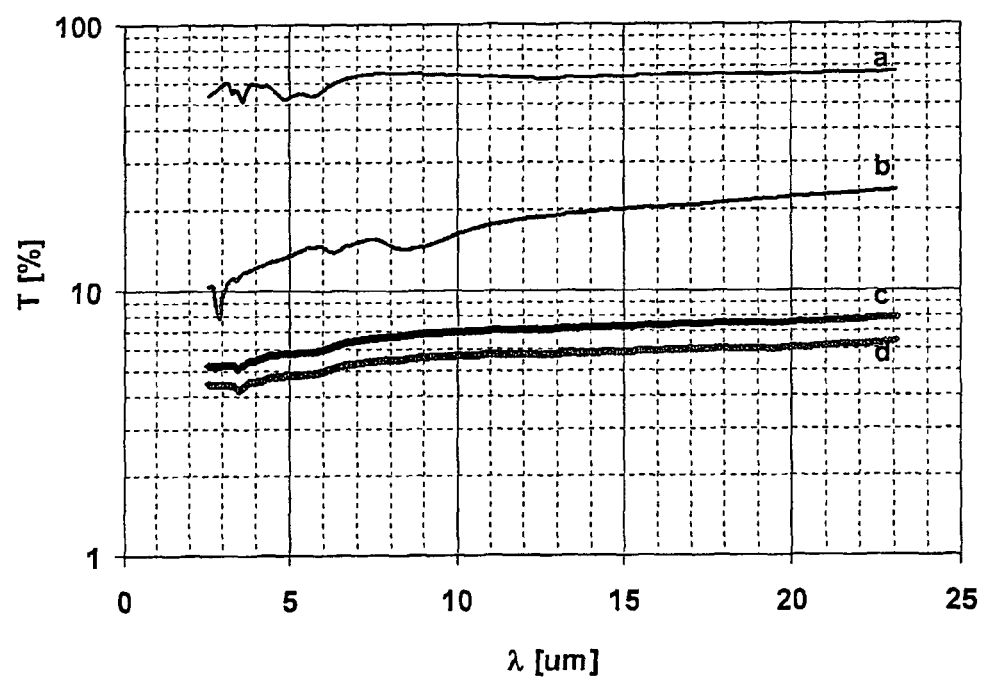

PROCESS FOR THE PREPARATION OF NANO-SCALED GRAPHENE PLATELETS WITH A HIGH DISPERSIBILITY IN LOW-POLARITY POLYMERIC MATRIXES AND RELATIVE POLYMERIC COMPOSITIONS

FIELD OF THE INVENTION

The present invention relates to a process for the preparation of nano-scaled graphene platelets with a high dispersibility in polymeric matrixes with a low polarity and relative polymeric compositions.

More specifically, the nano-scaled platelets obtained with the methods described hereunder can generally be produced more easily on a wide scale and with a lower environmental impact with respect to nano-scaled platelets obtained by other methods already known. The nano-scaled platelets obtained with the process object of the present invention surprisingly have an improved electronic conductivity and a higher absorption capacity and radiation emission within the medium-long infrared range, if compared with nano-scaled platelets obtained with the methods known in the art.

Said nano-scaled platelets are surprisingly easily dispersible in non-polar or only slightly polar polymeric matrixes with respect to traditional nano-scaled fillers.

The nano-scaled graphene platelets according to the present invention are in the form of one or more graphene sheets, possibly functionalized or chemically modified, wherein each sheet prevalently consists of a hexagonal lattice in 2D of carbon atoms. Said nano-scaled graphene platelets have a thickness (i.e. the dimension in a direction orthogonal to the graphene sheet, or more generally, in the Cartesian tern, the smallest dimension) not greater than 300 nm, an average length, width, or diameter not greater than 50 micrometers and a surface area ranging from 40 to 2000 $m^2/g$.

An object of the present invention also relates to the thermoplastic polymeric compositions obtained from the use of said nano-scaled platelets, with a content of nano-scaled platelets, calculated with respect to the weight of the polymer, for example not higher than 30%.

The end-products obtained from said nanocomposite compositions typically have improved mechanical resistance and electric conductivity and thermal insulation, with respect to analogous formulations using polymers without additives, or even with traditional fillers at the same concentration. Said end-products are particularly useful in the field of plastic articles having high thermal, electric and mechanical performances.

The present invention therefore also relates to granules/beads based on expandable thermoplastic polymers, for example polymers of expandable styrene, filled with said nano-scaled graphene platelets, in a concentration, calculated with respect to the weight of the polymer, for example not higher than 30%. The expanded end-products obtained from said beads/granules typically have a higher mechanical resistance, improved thermal insulation and antistatic capacity, with respect to analogous formulations but using traditional fillers such as graphite and coal (carbon black). These end-products are particularly useful in the field of thermal insulation for the building industry.

DESCRIPTION OF THE KNOWN ART

The recent development on an industrial scale and the growing commercial demand for polymeric nanocomposite compositions is orienting scientific interest towards the synthesis of new nano-materials, which are highly performing and easily dispersible in polymeric matrixes. In particular, said nano-materials have dimensions comparable with those of the polymer chains and high aspect ratios (L/D>100).

Carbon nanotubes (CNT), for example, are graphenic nano-materials, which thanks to the high aspect ratio (L/D) and exceptional electric, mechanical and other properties, are widely applied in the field of polymeric nanocomposites (US 2009/030090, US 2009/200517, WO 2006/114495, CA 2647727).

Patent application CA 2647727 relates to polymeric nanocomposite compositions, with improved mechanical properties, based on carbon nanotubes (combination of MWNT and DWNT) and an epoxy matrix.

International patent application WO 2006/114495 describes polymeric foams (thermoplastic and thermosetting) with cell dimensions<150 µm containing nanotubes in a concentration lower than 60% by weight. These foams are used in the field of food packaging, thermal insulation, membranes, etc.

CNTs are generally divided into two main groups: single-walled nanotubes (SWNT) and multi-walled nanotubes (MWNT). An ideal SWNT can be described as a rolled up graphene sheet forming a tubular structure closed at the ends by two semi-fullerenes. SWNTs typically have diameters of 1-10 nm and lengths in the order of microns, resulting in aspect ratio>1000. Depending on the rolling direction of graphene sheet, it is possible to distinguish chiral (helicoidal) and non-chiral structures.

Studies on the electric properties of SWNTs have shown that these can have both a metallic and semiconductor behaviour according to the diameter and chirality.

MWNTs, described as concentric graphene tubes connected by weak Van der Walls forces, typically have electronic properties similar to SWNTs.

Carbon nanotubes are currently still extremely costly and often require complex chemical and/or mechanical manipulations for guaranteeing adequate interfacial adhesions and a good dispersion degree in the polymeric matrix.

Recently, graphene (hexagonal bidimensional lattice of carbon atoms) and nano-scaled graphene platelets (deriving from the superimposing of one or more graphene sheets) have been found to be an effective and more economical alternative to carbon nanotubes.

Numerous studies have been carried out in recent years aimed to optimizing the synthesis processes of these materials. In a first production procedure, said nano-scaled graphene platelets are obtained using graphite oxide (GO) as precursor. There are three methods for the oxidation of graphite, which are most widely used (Brodie B. C., *Philos. Trans. R. Soc. London,* 149, 249 (1859); Staudenmaier L., *Ber. Dtsh. Chem. Ges,* 31, 1481 (1898); Hummers W. et al, *J. Am. Chem. Soc.,* 80, 1339 (1958)), according to which the oxidation takes place in an acid environment (for example sulfuric acid and nitric acid) in the presence of potassium salts. The graphite oxide produced is subjected to consecutive washing operations in aqueous solution and filtrations, to be finally dried under vacuum.

The graphite oxide obtained according to one of the methods mentioned above is a material consisting of graphite layers intercalated with:
  oxygen groups covalently bound (i.e. epoxy, hydroxyl groups and to a lesser extent carbonyl and carboxylic groups);
  water, non-covalently bound (Stankovich et al, Carbon, 45, 1558-1565 (2007)).

Graphite oxide can be characterized by means of X-ray diffraction (XRD). The XRD spectrum typical of GO generally indicates an interplanar distance of about 0.71 nm (WO 2008/045778) consequently higher than the distance of 0.34 nm typical of pristine graphite.

The functional groups of GO make this material highly hydrophilic and therefore easily exfoliable in aqueous solution. In particular, in patent application WO 2008/048295, sonic waves are used, having a frequency of about 20 kHz, for example, for exfoliating graphite oxide in water, finally obtaining stable colloidal suspensions.

Graphite oxide is generally a material which is electrically insulating and optically not very thick in medium infrared, its hydrophilic nature, moreover, makes it incompatible with the most common organic polymers, and in particular slightly polar or non-polar polymers.

To avoid these drawbacks, literature has proposed various methods, both physical and chemical, which, starting from graphite oxide as precursor, give nano-scaled graphene platelets for a potential use in polymeric nanocomposites (WO 2008/045778; Stankovich et al, *Carbon*, 45, 1558-1565 (2007); Tung et al, *Nature Nanotech.* 4, 25-29 (2008); WO 2008/048295; Si and Samulski, Nano Letters, 8, 1679-1682 (2008); WO 2009/018204; WO 2009/049375).

The rapid heating of GO, for example, can lead to the volatilization of the intercalating agents with a consequent expansion and thermal exfoliation of the graphene sheets. Patent application WO 2008/045778 indicates that the rapid heating (>2000° C./min) of GO (or also of a GO-water suspension), in an inert atmosphere (for example nitrogen, argon or a mixture of the two), leads to an expansion/delamination of the graphite oxide. Nano-scaled graphene platelets are thus obtained, more specifically functionalized graphene (abbreviated FGS in the present document), typically having few epoxy, hydroxyl and carboxyl groups, and characterized by an improved electric conductivity and dispersibility in the most common thermoplastic and elastomeric polymers. FGS materials with surface areas of ~1500 m$^2$/g and with an XRD spectrum in which both the crystalline peak typical of pristine graphite and that typical of graphite oxide are absent, correspond to thermal gradients in the order of 2000° C./min.

Nano-scaled graphene platelets can also be produced by the chemical reduction of GO, dispersed in aqueous solution, with the use of hydrazine hydrate ($H_2NNH_2$—$H_2O$) or other reducing agents (StanKovich et al, Carbon, 45, 1558-1565 (2007)). As the reduction proceeds, however, coalescence phenomena may arise, linked to the insolubility in aqueous environment of the reduced oxide, with consequent reaggregation phenomena which lead to the formation of macroparticles of graphite.

Tung et al. (Nature Nanotech. 4, 25-29 (2008)) have reduced GO to pure hydrazine, obtaining hydrazine graphene (HG), electrically conductive, which can be dried and resuspended in organic solvents such as dimethylsulfoxide (DMSO) or N,N-dimethylformamide.

In patent application WO 2008/048295, the reduction of GO is conducted in the presence of a polymeric material (for example poly(sodium 4-styrene sulfonate) or PSSS), used at a high concentration (weight ratio 10:1=PSS:GO). This allows to obtain nano-scaled graphene platelets grafted with polymeric groups (for example PSS) thanks to which coalescence phenomena are avoided during the reduction.

Alternative synthesis methods for the production of nano-scaled graphene platelets envisage the exfoliation of graphite or its derivatives (US 2009/0026086; US 2008/0206124; US 2008/0258359; US 2009/0022649; Hernandez et al, Nat. Nanotechnol. 3, N. 9, pages 563-568, 2008; Hernandez et al, J. Am. Chem. Soc., 2009, 131 (10), pages 3611-3620; US 2009/0155578; Li et al, Science 319, 1229-1232 (2008); Li et al, Nature Nanotech. 3, 538-542 (2008)) with the use of chemical and/or physical methods. Hernandez et al, ("High-yield production of graphene by liquid-phase exfoliation of graphite", Nat. Nanotechnol. 3, N. 9, pages 563-568, 2008) describe a method for obtaining colloidal suspensions of high-quality single graphene sheets by sonication and consequent exfoliation of the graphite in organic solvents such as N-methyl pyrrolidone (NMP), N,N-dimethyl acetamide, γ-butyrolactone, 1,3-dimethyl-2-imidazolidinone (DMEU).

As indicated by Hernandez et al., however, the performance of these processes is generally limited. The authors indicate yields of 1-12%.

DESCRIPTION OF THE INVENTION

The present invention also relates to functionalized graphite (or graphite materials) (FOG), to the nano-scaled graphene platelets obtained from the exfoliation/reduction of said functionalized graphene precursor (FOG), to the thermoplastic polymeric compositions filled with said nano-scaled platelets and, particularly, to the process for the preparation of said nano-scaled graphene platelets. The present invention is better described in the enclosed claims.

The nano-scaled graphene platelets, object of the present invention, are synthesized starting from a functionalized graphene precursor and are in the form of one or more graphene sheets, possibly functionalized or chemically modified, wherein each sheet prevalently consists of a hexagonal 2D lattice of carbon atoms.

In particular, the nano-scaled graphene platelets to which the present invention relates have a thickness (orthogonal to the graphene sheet) not greater than 300 nm. The thickness is preferably less than 100 nm, even more preferably, the thickness ranges from 0.3 to 50 nm. Said nano-scaled platelets also have an average dimension (length, width, or diameter) not greater than micrometers, preferably not greater than 10 micrometer, even more preferably not greater than 2,000 nm. The nano-scaled graphene platelets, to which the present invention relates, have a surface area>40 m$^2$/g. The surface area preferably ranges from 40 to 2,000 m$^2$/g, even more preferably the surface area ranges from 90 to 2,000 m$^2$/g.

Said nano-scaled platelets have a carbon/oxygen (C/O) molar ratio, as determined by elemental analysis, higher than 20/1, more preferably higher than 40/1, even more preferably ranging from 80/1 to 1,000/1.

Said nano-scaled platelets, obtained through the methods described hereunder, can be generally more easily produced on a wide scale and with a lower environmental impact with respect to the other methods already known.

In particular, an object of the present invention, relates to nano-scaled graphene platelets obtained starting from a graphene precursor alternative to graphite oxide.

The Applicant has surprisingly found that graphite and/or graphite materials can be selectively functionalized with oxygen groups through non-conventional physical treatment, more economical and with a lower environmental impact with respect to other methods already known (Brodie B. C., Philos. Trans. R. Soc. London, 149, 249 (1859); Staudenmaier L., Ber. Dtsh. Chem. Ges, 31, 1481 (1898); Hummers W. et al, J. Am. Chem. Soc., 80, 1339 (1958)).

According to the present invention, this treatment consists of thermal oxidations in a controlled atmosphere.

A first procedure envisages that the oxidative thermal treatment takes place in the presence of oxygen at a variable concentration, preferably with $O_2$ contents ranging from 0.5 to 100% by volume with respect to the total, even more preferably from 1 to 30% by volume with respect to the total. Nitrogen or other inert gases, such as helium or argon, can be used for diluting the oxygen.

More specifically, the oxidation is effected in a furnace consisting of a quartz tube in which the graphite is placed, for times less than 5 hours, preferably from 1 to 3 hours, and at suitable temperatures, preferably lower than 700° C., even more preferably from 350° C. to 600° C.

A certain quantity of water vapour can also be advantageously added to the oxidizing atmosphere. The concentration of water vapour can vary from 0.5 to 50% by volume, preferably from 0.5 to 10% by volume, and even more preferably from 0.5 to 5% by volume.

The Applicant has also surprisingly found that graphite and/or graphite materials can also be functionalized with oxygen groups by means of ozone or a gas containing ozone.

The ozone, to which the present invention refers, can be generated, for example, according to one of the following procedures:
using a gas containing oxygen which is passed through a particular electric discharge (crown effect) which is generated between two electrodes separated by a dielectric material and from the actual discharging area;
using a UV lamp having a wavelength of around 185 nm;
using a cold plasma created by a dielectric barrier discharge.

The gas containing oxygen is passed around the lamp and the ozone is generated by the ultraviolet radiation emitted by the lamp.

The oxygen content in the gas can be variable. Higher contents generally provide a greater ozone yield. In particular cases, the gas can be air, in which case the oxygen is typically around 20%, or pure oxygen.

The functionalization of the graphite material is obtained by fluxing the gas containing ozone onto the graphite material.

The gas containing ozone is passed through the graphite material for a time greater than 1 minute, preferably for at time of more than 1 hour.

The gas and/or graphite material can be brought to a temperature ranging from −200° C. to 600° C., preferably from −30° C. to 200° C.

A stream of water vapour, which can be saturated or overheated, can also be advantageously fed together with the gas containing ozone. The water vapour can be added to the stream of gas before or after ozonization.

The graphite material used in the present invention can be natural, synthetic or expanded, it can have a particle diameter ranging from 0.5 to 50 μm, preferably from 1 to 15 with a specific area of 5-20 m$^2$/g. An example is the product UF 2 of Kropfmuhl having a particle diameter equal to 4.5 micrometers.

Alternatively, other graphite materials can be used. Graphite material or graphitic material is intended as being that described by IUPAC (see "RECOMMENDED TERMINOLOGY FOR THE DESCRIPTION OF CARBON AS A SOLID", from IUPAC Recommendations, 1995).

By applying the oxidation procedures described above, object of the present invention, a functionalized graphite or functionalized graphite material (FOG) is obtained with oxygen groups covalently bound (i.e. epoxy, hydroxyl groups and to a lesser extent carbonyl and carboxylic groups) and/or containing water not covalently bound. These functional groups are uniformly distributed in the graphite or in the graphite material and with a carbon molar ratio with respect to the oxygen higher than 8:1, preferably higher than 10:1.

Said functionalized graphite or graphite material has surprisingly proved to be an effective alternative to graphite oxide in the synthesis of nano-scaled graphene platelets.

Said functionalized graphite or graphite material surprisingly has a reduced hydrophilic nature, with respect to the graphite oxide obtained by the methods known in the art. Said FOG can form stable dispersions in suitable aprotic organic solvents (for example N,N-dimethylformamide, dimethylsulfoxide, N-methylpyrrolidone) in which it is also possible to dissolve the polymer of interest, or in aqueous solution, with the use of known surfactants such as sodium dodecylbenzene sulfonate.

The nano-scaled graphene platelets, object of the present invention, are synthesized starting from said functionalized graphene precursor, FOG, using the same procedures known in the art for the exfoliation and/or reduction of the graphite oxide precursor (see for example, WO 2008/045778; Stankovich et al, Carbon, 45, 1558-1565 (2007); Tung et al, Nature Nanotech. 4, 25-29 (2008); WO 2008/048295; WO 2009/018204; WO 2009/049375).

The nano-scaled platelets so produced are surprisingly characterized by a high electronic conductivity and a higher absorption capacity and radiation emission within the medium-long infrared range, if compared with nano-scaled platelets synthesized starting from graphite oxide having an equal specific surface.

Furthermore, said nano-scaled platelets contain few oxygen atoms, with respect to the carbon weight, bound to aromatic and/or aliphatic carbons.

With respect to the nano-scaled platelets obtained by the exfoliation/reduction of traditional graphite oxide, an improved dispersibility is obtained, in particular in non-polar or slightly polar polymeric matrixes.

Furthermore, polymeric chains can be inserted on the nano-scaled platelets, object of the present invention, in order to further improve their dispersibility in the polymeric matrixes.

An object of the present invention also relates to polymeric nanocomposite compositions using said nano-scaled graphene platelets.

The thermoplastic polymeric matrixes in which the nano-scaled graphene platelets, object of the present invention, can be dispersed, include vinyl polymers, such as for example polyethylene, polypropylene, and vinyl aromatic monomers, such as for example, polystyrenes, high impact polystyrene (HIPS), polyalphamethylstyrene and styrene-alphamethylstyrene copolymers.

The nanocomposite polymeric compositions, object of the present invention, have a content of nano-scaled platelets, calculated with respect to the weight of the polymer, not higher than 30%.

Preferably, said nanocomposite polymeric compositions contain 0.004-15% by weight of the nano-scaled platelets object of the present invention, more preferably 0.01-5%, even more preferably 0.04-2%, calculates with respect to the weight of the polymer.

Conventional additives, generally used with traditional materials, such as pigments, stabilizing agents, nucleating agents, flame-retardant systems, antistatic agents, release agents, etc., can be added to the nanocomposite polymeric compositions, object of the present invention.

Said nanocomposite compositions generally have a high electric conductivity which allows them to be used for antistatic applications ("ESD") and for protection from electromagnetic radiations ("EMI shielding").

The mechanical characteristics such as the elastic module and thermoresistance (increased glass transition temperature) are also improved.

The nano-scaled graphene platelets described above can be incorporated in a polymeric composition, object of the present invention, using various procedures.

A first method for the preparation of the nanocomposite composition is a solution process in which the polymer is dissolved in an adequate solvent, for example, N,N-dimethylformamide, N-methylpyrrolidone, tetrahydrofuran, etc. The nano-scaled graphene platelets are then added to the solution and dispersed, for example with the use of a sonic flow. In an alternative procedure, the nano-scaled graphene platelets can be pre-dispersed in a portion of solvent and said dispersion is subsequently mixed with the polymeric solution. In many cases, the solvent can be low-boiling so as to be removed from the product by evaporation. When a higher-boiling solvent is used, the composite can be recovered by precipitation with a suitable solvent followed by filtration and/or centrifugation. The solution methods are particularly useful when the nano-scaled graphene platelets are directly synthesized in the form of stable suspensions in suitable solvents.

Alternatively, the functionalized graphene precursor (FOG), object of the present invention, thanks to its reduced hydrophilic nature, can be directly dispersed in the polymeric solution of interest (for example N,N-dimethylformamide and polystyrene) and simultaneously reduced with dimethylhydrazine or other reducing agents. This allows a nanocomposite composition to be obtained, with a high dispersion degree of the nano-scaled platelets inside the polymer.

A second method for the preparation of the nanocomposite composition consists in mixing in the molten state, in which the polymer is brought to temperatures higher than the melting point or softening point and then mixed with the nano-scaled graphene platelets. The nano-scaled platelets used for this purpose are preferably in powder form. The mixing can be made with devices commonly used for the processing of plastic materials (twin-screw extruder, Brabender mixer, etc.).

In a further alternative procedure, the polymer in powder form and the nano-scaled graphene platelets, also in powder form, can be pre-mixed by dry blending or turbomixing and subsequently processed in mixers at the molten state. The pre-mixing guarantees a better dispersion degree of the nano-filler inside the polymer matrix.

Another alternative method is represented by polymerization in-situ, in which the nano-scaled graphene platelets are dispersed in a monomer which is subsequently polymerized. The monomer can also be dissolved in a suitable solvent so that the low viscosities can ensure a good dispersion degree of the nano-charges. The polymerization can also be carried out under stirring conditions in order to ensure that the nano-scaled platelets remain dispersed during the process.

The nano-scaled platelets can possibly be functionalized before polymerization; in particular, vinyl groups can be inserted. In this way, the nano-scaled platelets can be co-polymerized, thus preventing re-aggregation even if the polymer is brought above the melting point.

The Applicant has also found a method for producing said nano-scaled graphene platelets during the polymerization itself. This method comprises dispersing the functionalized graphene precursor (FOG), object of the present invention, in an aqueous suspension with the use of surfactants (for example sodium dodecylbenzene sulfonate). The monomer is then added and the polymerization is carried out in suspension. Reducing agents (for example hydrazine or methylhydrazine) are added contemporaneously, or before beginning the polymerization, but already with the monomer suspended in the aqueous solution, in order to reduce the precursor of the nano-scaled graphene platelets. The polymerization can then be terminated according to the normal methods in use. This allows an optimum dispersion degree of the nano-scaled platelets in the polymeric matrix, to be obtained.

A further object of the present invention relates to compositions of expandable vinyl and vinyl aromatic polymers, for example in granules or beads or the molten mixture, which comprise:
  a) a polymeric matrix produced by the polymerization of a base comprising one or more polymerizable monomers, for example vinyl and vinyl aromatic monomers;
  b) 1-10% by weight, calculated with respect to the polymer (a), of an expanding agent englobed in the polymeric matrix;
  c) 0.004-15% by weight, preferably 0.01-5% by weight, even more preferably 0.04-2%, calculated with respect to the polymer (a), of the nano-scaled platelets, object of the present invention.

An object of the present invention also relates to the foams or expanded articles deriving from the use of the expandable compositions indicated above, in which the expanding agent is therefore no longer contained in the composition, or is contained in a smaller percentage.

It has been surprisingly found that the foams obtained from said expandable composites show, at the same density obtained, an improved thermal insulation if compared with the foams of polymers not containing said nano-scaled platelets. The thermal insulation capacity is surprisingly generally better with respect to the foams obtained using other athermanous agents such as, for example, coal, graphite and aluminum flakes.

It has also been found that in these innovative nanocomposite foams, it is possible to confer flame retardant characteristics with a reduced concentration of traditional flame-retardant additives, such as halogen-derivatives.

The expandable polymeric composition, object of the present invention, can be prepared, as better illustrated hereunder, by means of:
1. a process in suspension, which comprises the dissolution/dispersion of the nano-scaled graphene platelets, and possible additives, in the monomer, followed by polymerization in aqueous suspension and addition of the expanding agent; or
2. a process in suspension which comprises the suspension, for example aqueous, of a preformed polymeric composition comprising said polymeric matrix and said nano-scaled graphene platelets, followed by the addition and incorporation of the expanding agent; or
3. a continuous mass process which includes the following steps, in series:
  mixing a vinyl or vinyl aromatic polymer in the form of granules or powder or already in the molten state, with said nano-scaled graphene platelets (as such or in the form of master-batch) and other possible additives;
  possibly, if not already in the molten state, bringing the polymeric mixture to a temperature higher than the melting point of the vinyl aromatic polymer;
  incorporating the expanding agent in the molten polymer, together with other possible additives, such as flame-proof systems based on a flame-retardant system containing from 0.1 to 3% by weight, with respect to the monomeric base, preferably from 0.4 to 2.2%, of a self-extinguishing brominated additive containing at least 30% by weight of bromine, preferably from 50 to 90% by weight, and from 0 to 1% by weight, with respect to the monomeric base, preferably from 0.01 to 0.4%, of a synergic product containing at least one C—C or O—O thermolabile bond;

mixing the polymeric composition thus obtained by means of static or dynamic mixing elements;

feeding the polymeric composition thus obtained to a cutting die under pressure (for example according to the procedures described in U.S. Pat. No. 7,320,585); or 4. a direct extrusion process, i.e. feeding a mixture of granules of vinyl aromatic polymer and nano-scaled graphene platelets (as such, or in master-batch form), directly to an extruder, into which the expanding agent is also fed. Alternatively, the polymer can already derive in the molten state from a polymerization plant in solution.

Some illustrative and non-limiting examples are provided hereunder for a better understanding of the present invention and for its embodiment.

The examples refer to FIG. 1 which represents the transmittance (T) in medium infrared (400-4000 $cm^{-1}$) vs the wavelength ($\lambda$) for:

a) Graphite oxide from chemical oxidation as in Example 11;
b) nano-scaled platelets obtained therefrom as in Example 11;
c) FOG from thermal oxidation as in Example 8; and
d) nano-scaled platelets obtained therefrom as in Example 8.

Example 1

Preparation of Nano-Scaled Graphene Platelets Starting from Ozone

Graphite in powder form of the type UF2-96/97 produced by Kropfmuhl is inserted in a tube of aluminium oxide and blocked at the ends by means of quartz wool. The tube is inserted in a refrigerator so as to maintain a temperature of −18° C. A series of ozone generators are used, of the type Microlab produced by the company Biaccabi, fed by an oxygen cylinder. The ozone thus produced is pre-cooled by passing it in a coiled tube situated inside said refrigerator. It is then flushed through the tube containing graphite.

After 24 hours of flushing with ozone, the tube containing the precursor of nano-scaled graphene platelets (FOG) is extracted from the refrigerator, then inserted in a Lindberg furnace preheated to 1,100° C. and in an argon atmosphere. After 30 seconds, the tube is extracted from the furnace and left to cool, again in a stream of Argon.

The nano-scaled platelets obtained are in a quantity equal to about 30% of the weight of the starting graphite. The carbon/oxygen ratio, as determined by elemental analysis, proved to be 1,000.

Example 2

Preparation of Nano-Scaled Graphene Platelets Starting from Ozone

Graphite in powder form of the type UF2-96/97 produced by Kropfmuhl is inserted in a tube of aluminium oxide and blocked at the ends by means of quartz wool. The tube is inserted in a refrigerator so as to maintain a temperature of −18° C.

A series of ozone generators are used, of the type Microlab produced by the company Biaccabi, fed by an oxygen cylinder. The ozone thus produced is pre-cooled by passing it in a coiled tube situated inside said refrigerator. It is then flushed through the tube containing graphite. At the outlet, part of the gas is recycled in the stream of oxygen at the inlet of the ozonizer, by means of Venturi tube. The graphite is subjected to said ozone flow for a period of 12 hours. The precursor (FOG) thus obtained is then fed to a Lindberg furnace according to Example 1.

The nano-scaled platelets obtained are in a quantity equal to about 400 of the weight of the starting graphite.

The carbon/oxygen ratio, as determined by elemental analysis, proved to be 700.

Example 3

Preparation of the Composite Polystyrene—Nano-Scaled Graphene Platelets

The precursor of the nano-scaled graphene platelets (FOG) is produced according to Example 2.

97.5 parts of polystyrene are dissolved in N,N-dimethylformamide. 2.5 parts of the precursor of the nano-scaled graphene platelets are dispersed in the solution with the aid of an ultrasound sonotrode immersed in the solution. The latter is heated to 90° C., dimethylhydrazine is then added and left to act for 24 hrs. The solution is fed dropwise to a container filled with methanol and kept under vigorous stirring. The compound, separated by centrifugation, is washed, dried and a pestle is used to reduce it to powder form.

The composition thus obtained is fed to a twin-screw extruder where it is melted and mixed. The polymeric melt is granulated by cutting into spaghetti. A degassing section is present in the extruder, where the volatile components are removed by vacuum suction. The nanocomposite, in granule form, is then hot moulded by means of a press (Hot press—Saspol model TC50A). The moulded samples have a width of ~2 cm, a length of ~2.5 cm and a thickness of 0.8±0.1 mm (the thickness was determined using a micrometer). Two coplanar gold electrodes, having a thickness of 25 nm, a width of 5 mm and at a distance of about 1 mm from each other are then deposited, by sputtering, on said plaques, and the electric conductivity of the nanocomposite is finally measured. The electric conductivity measurements were effected with a Source Measurement Unit, Keithley 2400 having two electrodes at room temperature.

The electric conductivity measured proved to be $10^{-5}$ S/m.

Example 4

Preparation of Expandable Polystyrene Containing Nano-Scaled Graphene Platelets 61 parts of polystyrene N 1782 produced by Polimeri Europa, 2 parts of etyhelene-bis-stereamide; 20 parts of Saytex HP 900 (hexabromocyclododecane sold by Alberarle) 5 parts of Perkadox 30 (2,3-dimethyl-2,3-diphenyl butane, sold by Akzo Nobel) and 12 parts of the masterbatch of nano-scaled graphene platelets produced according to Example 3, are mixed in a twin-screw extruder.

5 parts of a mixture of n-pentane (75%) and iso-pentane (25%) are added to the polymeric melt at the outlet of the single-screw extruder. The mixture thus obtained is mixed by means of a series of static mixing elements. A gear pump increases the pressure of the mixture thus obtained to 200 barg. The mixture is then cooled to about 170° C. by means of a mixing exchanger (SMR).

The composition is then distributed to the die, where it is extruded through a number of holes having a diameter of 0.5 mm, immediately cooled with a jet of water and cut with a series of rotating knives (according to the method described in U.S. Pat. No. 7,320,585).

The pressure in the granulation chamber is 5 bar. The water is used as a cooling spray liquid and nitrogen is used as carrier gas.

The resulting granules are dried with a centrifugal drier and then covered with a coating. The coating is prepared by adding to the granules 3 parts of glyceryl monostearate, 1 part of zinc stearate and 0.2 parts of glycerine per 1,000 parts of dried granules. The additives of the coating are mixed with the granulate by means of a continuous screw mixer.

The product is expanded to 17 g/l with vapour at a temperature of 100° C., left to age for 1 day and partly used for the moulding of blocks (having dimensions of 1040×1030×550 mm) and again partly expanded and then moulded into blocks having a density of 12.5 g/l.

The blocks were then cut to prepare flat sheets on which the thermal conductivity is measured.

Some of the sheets, obtained from the same blocks, are put in an oven at 70° C. for 2 days. Test samples are then collected (9 cm×19 cm×2 cm) for the fire behaviour test according to the standard DIN 4102. The test samples pass the test.

The analysis of the coal content proved to be equal to 0.3% by weight. The thermal conductivity proved to be 32.0 mW/mK at 17 g/l. The stress at 10% compression, effected according to EN ISO 844, proved to be 110 kPa again at 17 g/l.

Example 5

Preparation of Nano-Scaled Graphene Platelets Starting from Ozone

Graphite in powder form of the type UF2-96/97 produced by Kropfmuhl is inserted in a tube of aluminium oxide.

A series of ozone generators are used, of the type Microlab produced by the company Biaccabi, fed by dried air. The gaseous stream containing ozone thus produced is mixed with a stream of air saturated with water vapour, in a volume ratio 95:5. The mixture thus obtained is flushed through the graphite for 24 hours. Part of the gas leaving said mixture is recycled after the injection of the air containing water vapour.

The tube of aluminium oxide containing functionalized graphite (FOG) is flushed for a few minutes in argon, and then rapidly inserted in a furnace having a Lindberg tube, constantly maintained in an argon atmosphere. The furnace is preheated to 1,100° C. After 30 seconds the tube is extracted from the furnace and left to cool again in a stream of Argon.

Example 6

Preparation of the Composite Polystyrene—Nano-Scaled Graphene Platelets 980 parts of polystyrene EDISTIR N1782 (polystyrene having a Mw of 180,000 g/mol, Mw/Mn=2.3, MFI (200° C., 5 kg) equal to 7.5 g/10', produced by Polimeri Europa) are micronized in a mill.

20 parts of nano-scaled graphene platelets produced as described in Example 5, are mixed for 30 seconds at 2,000 rpm in a high shear powder mixer (mixer Plasmec mod. TRL 10) together with 980 parts of micronized polystyrene.

The powder obtained is extruded and hot moulded by means of a press. Two gold electrodes are deposited on the plaque obtained and the electric conductivity of the nanocomposite composition is finally measured as described in Example 3. The electric conductivity measured proved to be $10^{-6}$ S/m.

Example 7

Preparation of the Composite Polyethylene—Nano-Scaled Graphene Platelets

In a mill cooled with liquid nitrogen are fed 800 parts of linear low density polyethylene of the type Flexirene FG 30 produced by Polimeri Europa (density 0.925 g/l, MFI 190°, 2.16 kg equal to 1.0 g/10') and 200 parts of the composition obtained in Example 5. The composition thus obtained is fed to a twin-screw extruder where it is melted and mixed. The polymeric melt is granulated by underwater cutting.

The granule thus obtained is hot moulded with a press. Two gold electrodes are then deposited on the plaque obtained and the electric conductivity of the nanocomposite composition is finally measured as described in Example 3. The electric conductivity measured proved to be $10^{-3}$ S/m.

Example 8

Preparation of Nano-Scaled Graphene Platelets Starting from Thermal Oxidation

Graphite in powder form of the type UF2-96/97 produced by Kropfmuhl is inserted in a tube of aluminium oxide and blocked at the ends by means of quartz wool.

The tube is inserted in a muffle furnace in a nitrogen atmosphere preheated to 550° C. A mixture of 10 parts of air, 40 parts of nitrogen and 50 parts of water vapour is heated passing it through a coiled tube placed inside said muffle and is then fed into the tube containing graphite. After 4 hrs at 550° C. the muffle is extinguished, still maintaining the flushing. The tube containing the graphite functionalized with oxygen groups (FOG) is fed to a Lindberg tube furnace preheated to 1,100° C., for a time of 30 seconds.

The powder thus obtained was characterized by means of medium infrared transmittance spectroscopy (MIR 400-4000 $cm^{-1}$), using an FT-IR BRUKER spectrometer mod. Tensor 27. The samples were pulverized and dispersed for the measurement, in a concentration equal to 0.1% by weight, in potassium bromide (KBr). 13 mm disks were finally pressure sintered. The MIR spectra, in terms of transmittance, for the FOG and nano-scaled graphene platelets, obtained starting from thermal oxidation, are indicated in FIG. 1.

Example 9

Preparation of the Composite Polystyrene—Nano-Scaled Graphene Platelets 900 parts of polystyrene EDISTIR N2982 (polystyrene having a Mw of 130,000 g/mol, Mw/Mn=2.3, MFI (200° C., 5 kg) equal to 25 g/10', produced by Polimeri Europa) are micronized in a mill.

100 parts of nano-scaled graphene platelets prepared as described in Example 8, are mixed for 30 seconds at 2,000 rpm in a high shear powder mixer (mixer Plasmec mod. TRL 10) together with 900 parts of micronized polystyrene.

The composition thus obtained is fed to a twin-screw extruder where it is melted and mixed. The polymeric melt is granulated by cutting into spaghetti. A degassing section is present in the extruder, where the volatile components are removed by vacuum suction.

The granule thus obtained is hot moulded by means of a press. Two gold electrodes are then deposited on the plaque obtained and the electric conductivity of the nanocomposite composition is finally measured as described in Example 3. The electric conductivity measured proved to be $10^{-4}$ S/m.

Example 10

Comparative 0.4 parts of sodium dodecylbenzene sulfonate are dispersed in 1,000 parts of deionized water by stirring with a magnetic anchor.

5 parts of graphite "UF1 98.5", produced by Kropfmuhl, are then added to the solution, maintaining it under constant stirring.

After about 5 hours, the product thus obtained is subjected to centrifugation. The filtrate is separated from the supernatant phase, the latter is dried for 8 hours in an oven at 60° C. under a stream of nitrogen. There are only 0.2 parts in the supernatant phase, i.e. 4% by weight of the graphite originally dispersed.

Example 11

Comparative

The nano-scaled graphene platelets are produced starting from graphite oxide, according to the Hummers method. The graphite oxide thus obtained is inserted in a ceramic tube and fixed to the ends with quartz wool. The tube is then inserted in a Lindberg furnace preheated to 1,100° C. and in an argon atmosphere. After 30 seconds, the tube is extracted from the furnace and left to cool again in a stream of Argon.

The powder thus obtained was characterized by means of medium infrared transmittance spectroscopy (MIR 400-4000 $cm^{-1}$), according to the procedure described in Example 8. The MIR spectra, in terms of transmittance, for the graphite oxide obtained chemically and nano-scaled graphene platelets obtained by thermal exfoliation starting from said graphite oxide, are indicated in FIG. 1. From a comparison, in FIG. 1, an increase in the medium infrared absorption can be observed, in the case of the FOG samples and relative nano-scaled platelets prepared as described in Example 8.

In the nano-scaled platelets it was found that the carbon/oxygen ratio, as determined by elemental analysis, proved to be 10/1.

980 parts of polystyrene EDISTIR N1782 (polystyrene having a Mw of 180,000 g/mol, Mw/Mn=2.3, MFI (200° C., 5 kg) equal to 7.5 g/10', produced by Polimeri Europa) are micronized in a mill.

20 parts of nano-scaled graphene platelets are mixed for 30 seconds at 2,000 rpm in a high shear powder mixer (mixer Plasmec mod. TRL 10) together with 980 parts of micronized polystyrene.

The mixture thus obtained is fed to a twin-screw extruder where it is melted and mixed. The polymeric melt is granulated by cutting into spaghetti. A degassing section is present in the extruder, where the volatile components are removed by vacuum suction.

The granule thus obtained is hot moulded by means of a press. Two gold electrodes are then deposited on the plaque obtained and the electric conductivity of the nanocomposite composition is finally measured as described in Example 3. The electric conductivity measured proved to be $10^{-8}$ S/m.

The invention claimed is:

1. A process for producing a nano-scaled graphene platelet, the process consisting of:
   (a) contacting a graphite material with oxygen or ozone, wherein the oxygen or ozone comprises up to 50% by volume of water in the liquid or gaseous state, to provide a precursor comprising a functionalized graphite material comprising oxygen groups and having a carbon/oxygen molar ratio higher than 8:1; and subsequently,
   (b) chemically or physically reducing the precursor, to provide a nano-scaled graphene platelet having a carbon/oxygen molar ratio higher than 20:1.

2. The process of claim 1, wherein:
   the functionalized graphite material has a carbon/oxygen molar ratio higher than 10:1; and
   the nano-scaled graphene platelet has a carbon/oxygen molar ratio higher than 50:1.

3. The process of claim 1, wherein, during (a), the graphite material is contacted with ozone.

4. The process of claim 1, wherein, during (a), the graphite material is contacted with oxygen.

5. The process of claim 1, wherein the oxygen or ozone comprises from 0.5 to 50% by volume water in liquid or gaseous state.

6. The process of claim 1, wherein the contacting is carried out at a temperature in a range from −200 to 600° C.

7. The process of claim 6, wherein the contacting is carried out at a temperature in a range from −200 to 10° C.

8. The process of claim 1, wherein the graphite material is a natural graphite, a synthetic graphite, or an expanded graphite.

9. The process of claim 1, wherein (b) is chemically reducing the precursor with at least one compound selected from the group consisting of water gas, hydrogen, hydrazine, and methyl hydrazine.

10. The process of claim 1, wherein (b) is physically reducing the precursor by heating the precursor to at least 600° C. with a thermal gradient of over 10° C. per minute.

11. The process of claim 10, wherein the heating is effected up to at least 900° C. with a thermal gradient of over 50° C. per minute.

12. The process of claim 1, wherein the contacting is carried out at a temperature in a range from −30 to 600° C.

* * * * *